United States Patent
Park et al.

(10) Patent No.: US 9,437,003 B2
(45) Date of Patent: Sep. 6, 2016

(54) METHOD, APPARATUS, AND SYSTEM FOR CORRECTING MEDICAL IMAGE ACCORDING TO PATIENT'S POSE VARIATION

(71) Applicant: SAMSUNG ELECTRONICS CO., LTD., Suwon (KR)

(72) Inventors: Dong-ryeol Park, Hwaseong (KR); Hyung-joo Kim, Seongnam (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 230 days.

(21) Appl. No.: 13/861,778

(22) Filed: Apr. 12, 2013

(65) Prior Publication Data

US 2014/0112529 A1    Apr. 24, 2014

(30) Foreign Application Priority Data

Oct. 24, 2012  (KR) .................. 10-2012-0118674

(51) Int. Cl.
*G06K 9/00* (2006.01)
*G06T 7/00* (2006.01)

(52) U.S. Cl.
CPC ........... *G06T 7/0044* (2013.01); *G06T 7/0028* (2013.01); *G06T 2207/10012* (2013.01); *G06T 2207/10068* (2013.01); *G06T 2207/10081* (2013.01); *G06T 2207/10088* (2013.01); *G06T 2207/30004* (2013.01); *G06T 2207/30204* (2013.01)

(58) Field of Classification Search
CPC ........... C07F 9/65744; C07F 9/65746; G06T 2207/10012; G06T 2207/10068; G06T 2207/10081; G06T 2207/10088; G06T 2207/30004; G06T 2207/30204; G06T 7/0012; G06T 7/0028; G06T 7/0044
See application file for complete search history.

(56) References Cited

U.S. PATENT DOCUMENTS

| | | | |
|---|---|---|---|
| 5,873,827 A | 2/1999 | Russell | |
| 6,119,033 A * | 9/2000 | Spigelman et al. | 600/426 |
| 6,484,049 B1 * | 11/2002 | Seeley et al. | 600/426 |
| 7,684,603 B2 | 3/2010 | Hashimoto | |
| 8,152,726 B2 | 4/2012 | Amiot et al. | |
| 8,675,939 B2 * | 3/2014 | Moctezuma de la Barrera | A61B 19/5244 382/128 |
| 2005/0027187 A1 * | 2/2005 | Barth | A61B 6/5247 600/407 |
| 2009/0310832 A1 | 12/2009 | Kim | |
| 2012/0050278 A1 | 3/2012 | Iizuka et al. | |
| 2013/0108017 A1 * | 5/2013 | Golubovic et al. | 378/41 |

FOREIGN PATENT DOCUMENTS

| | | |
|---|---|---|
| KR | 10-2008-0027256 | 3/2008 |
| KR | 10-2008-0064738 | 7/2008 |
| KR | 10-2011-0130968 | 12/2011 |

OTHER PUBLICATIONS

Philip J. Edwards et al., "Design and Evaluation of a System for Microscope-Assisted Guided Interventions (MAGI)", IEEE Transactions on Medical Imaging, vol. 19, No. 11, Nov. 2000, pp. 1082-1093.

* cited by examiner

*Primary Examiner* — Tom Y Lu
(74) *Attorney, Agent, or Firm* — Harness, Dickey & Pierce, P.L.c.

(57) ABSTRACT

Provided is a method of correcting a medical image according to a patient's pose variation. The method includes attaching a marker to an object, generating a first non-real-time image and a first real-time image when the object is in a first pose, generating a second real-time image when the object is in a second pose, and correcting the first non-real-time image based on shift information of the marker when the object is changed from the first pose to the second pose.

16 Claims, 12 Drawing Sheets

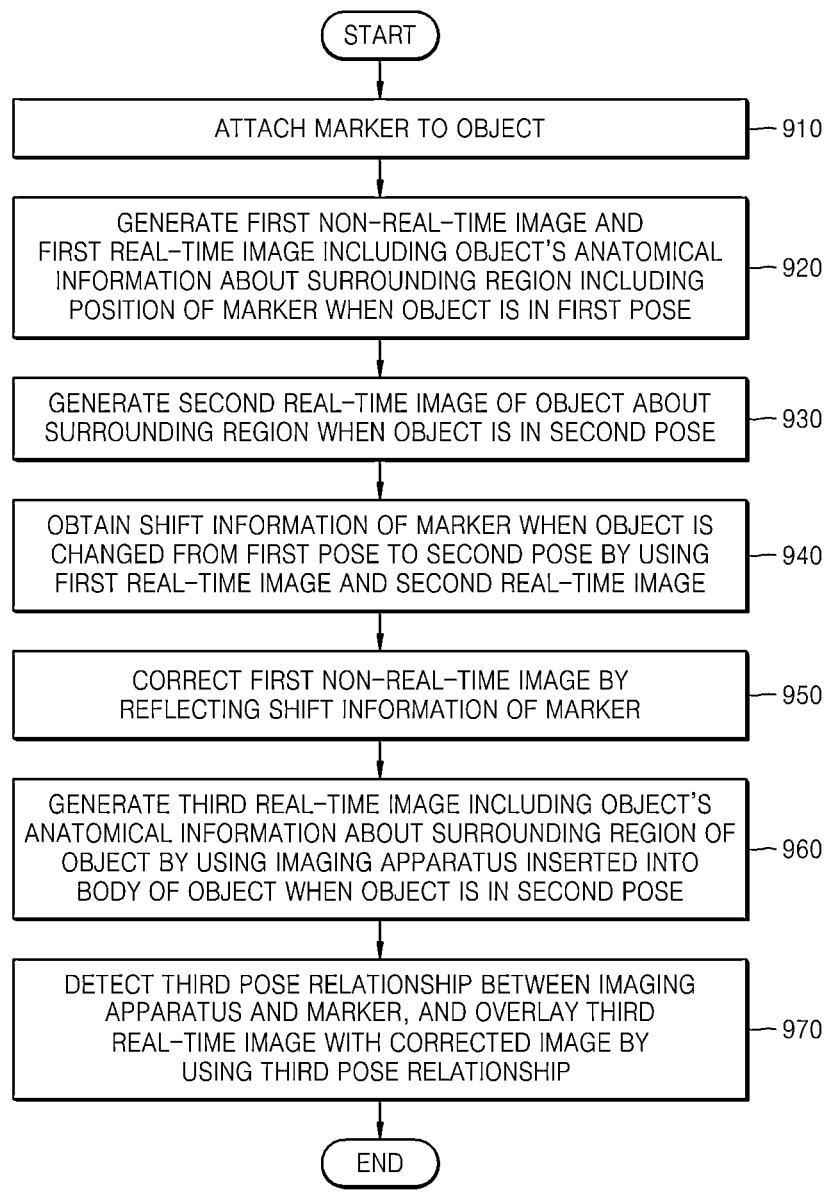

METHOD, APPARATUS, AND SYSTEM FOR CORRECTING MEDICAL IMAGE ACCORDING TO PATIENT'S POSE VARIATION

CROSS-REFERENCE TO RELATED APPLICATIONS

This application claims the benefit of Korean Patent Application No. 10-2012-0118674, filed on Oct. 24, 2012, in the Korean Intellectual Property Office, the disclosure of which is incorporated herein in its entirety by reference.

BACKGROUND

1. Field

One or more embodiments of the present disclosure relate to a method, apparatus, and system for correcting a medical image according to a patient's pose variation.

2. Description of the Related Art

In order to reduce damage to a patient during a surgical operation and allow quicker recovery, laparoscopic surgery has recently been frequently performed. Also, cases where a surgical robot is used to perform a surgical operation on a narrow tissue such as a prostate or a thyroid gland have increased gradually. Since robotic surgery using a surgical robot uses a three-dimensional (3D) stereo-endoscope, unlike existing laparoscopic surgery, depth perception is provided to a surgeon and a surgical region may be examined by enlarging an image. Also, since the robotic surgery is performed using the surgical robot, a mistake due to trembling of the surgeon's hand may be prevented and a fine motion may be better controlled. However, robotic surgery has problems in that the surgeon may not directly see with his or her own eyes the surgical region inside a patient's body and may just know a state of the surgical region by referring only to an image displayed on a monitor. Although the surgeon performs the robotic surgery after knowing the state of the surgical region using the image, for example, a computed tomography (CT) image, a magnetic resonance imaging (MRI) image, or an ultrasonic image, the robotic surgery is greatly dependent on the surgeon's experience. Also, since examples of the image of the surgical region, which may be obtained by using only the 3D stereo endoscope, such as a laparoscope, include only images of outer surfaces of tissues of organs in the patient's body, if the surgical region is covered by other organs or the surgical region is inside an organ, it is difficult to know an accurate position and an accurate shape of the surgical region.

SUMMARY

Provided are methods, apparatuses, and systems for correcting medical images according patients' pose variations. Also, provided are computer-readable recording media having embodied thereon programs for executing the methods. Technical problems to be solved are not limited to those described above, but may equally relate to other technical problems not described above.

Additional aspects will be set forth in part in the description which follows and, in part, will be apparent from the description, or may be learned by practice of the presented embodiments.

According to an aspect of the present disclosure, a method of correcting an image includes: attaching a marker to an object, and generating a first non-real-time image and a first real-time image including the object's anatomical information about a surrounding region including a position of the marker when the object is in a first pose; generating a second real-time image of the object about the surrounding region when the object is in a second pose; obtaining shift information of the marker when the object is changed from the first pose to the second pose by using the first real-time image and the second real-time image; and correcting the first non-real-time image based on the shift information of the marker.

According to another aspect of the present disclosure, a computer-readable recording medium has embodied thereon a program for executing the method.

According to another aspect of the present disclosure, an apparatus for correcting an image includes: a first image generating unit that generates a first non-real-time image including an object's anatomical information about a surrounding region including a position of a maker attached to the object when the object is in a first pose; a second image generating unit that generates a first real-time image including the object's anatomical information about the surrounding region when the object is in the first pose; a third image generating unit that generates a second real-time image of the object about the surrounding region when the object is in a second pose; a shift information obtaining unit that obtains shift information of the marker when the object is changed from the first pose to the second pose by using the first real-time image and the second real-time image; and an image correcting unit that corrects the first non-real-time image based on the shift information of the marker.

According to another aspect of the present disclosure, a system for correcting an image includes: at least one imaging apparatus that generates a first non-real-time image, and first through third real-time images including anatomical information of an object to which a marker is attached; and an image processing apparatus that obtains shift information of the marker by using the first real-time image and the second real-time image of the object generated by the imaging apparatus, and corrects the first non-real-time based on the shift information of the marker.

BRIEF DESCRIPTION OF THE DRAWINGS

These and/or other aspects will become apparent and more readily appreciated from the following description of the embodiments, taken in conjunction with the accompanying drawings in which:

FIG. 9 is a flowchart illustrating a method of correcting an image which is performed by the image processing apparatus, according to another embodiment of the present disclosure;

DETAILED DESCRIPTION

As used herein, the term "and/or" includes any and all combinations of one or more of the associated listed items. Expressions such as "at least one of," when preceding a list of elements, modify the entire list of elements and do not modify the individual elements of the list.

One or more embodiments of the present disclosure will now be described more fully with reference to the accompanying drawings, in which exemplary embodiments are shown.

Figure 1:
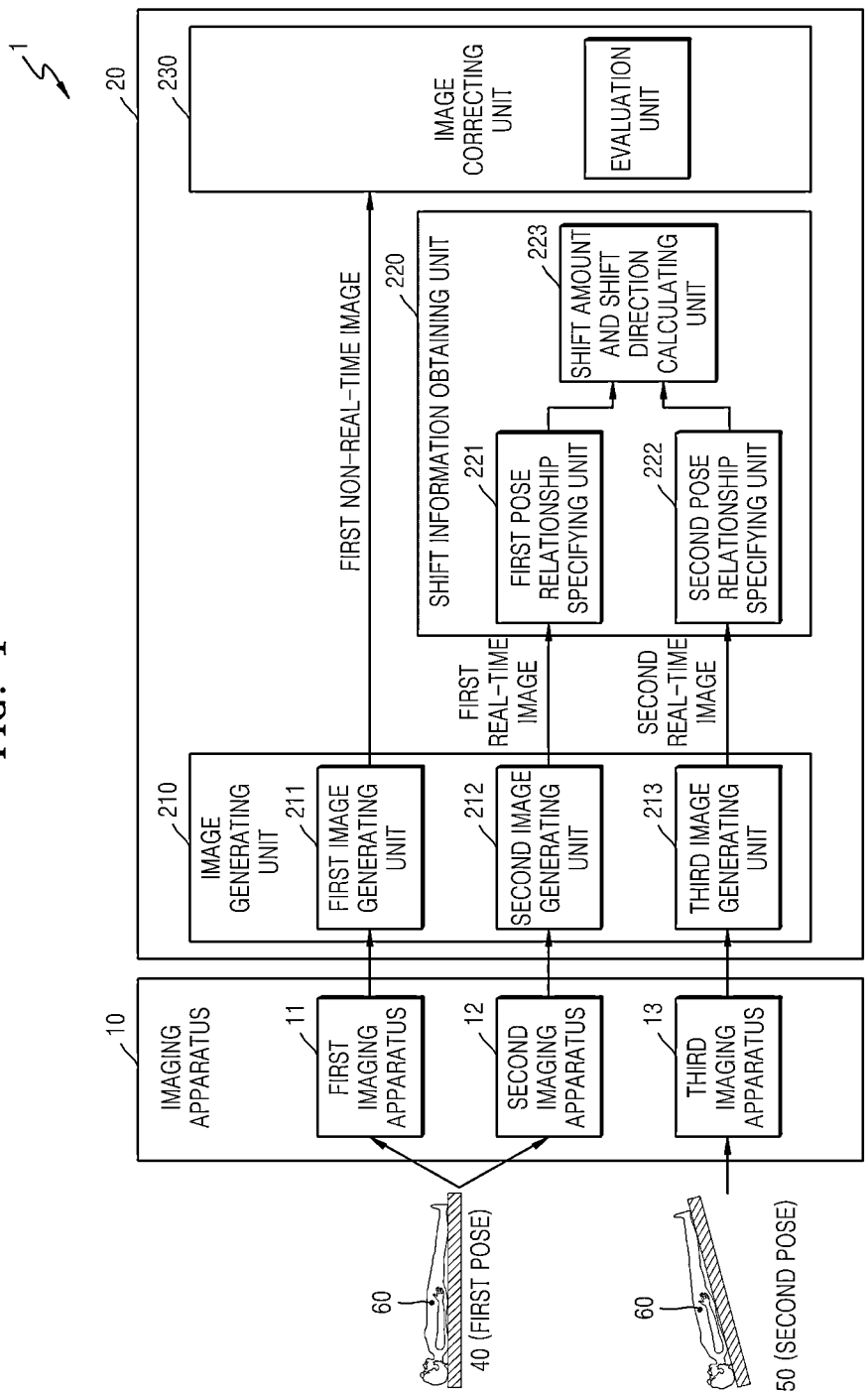
FIG. 1 is a block diagram illustrating a system of correcting an image, according to an embodiment of the present disclosure.

FIG. 1 is a block diagram illustrating a system 1 for correcting an image, according to an embodiment of the present disclosure.

Referring to FIG. 1, the system 1 may include, for example, an imaging apparatus 10 and an image processing apparatus 20. Also, the image processing apparatus 20 may include, for example, an image generating unit 210, a shift information obtaining unit 220, and an image correcting unit 230.

As shown, the system 1 of FIG. 1 illustrates only elements related to the present embodiment. However, it would be understood by one of ordinary skill in the art that the system 1 may further include general-purpose elements other than the elements illustrated in FIG. 1.

Also, each of the image generating unit 210, the shift information obtaining unit 220, and the image correcting unit 230 of the image processing apparatus 20 of FIG. 1 may correspond to one or more processors. Each processor may be embodied as an array of logic gates, and a combination of a general-purpose microprocessor and a memory storing a program executable by the general-purpose microprocessor. Also, it would be understood by one of ordinary skill in the art that the processor may be embodied as another type of hardware.

In an embodiment of the system 1 for correcting an image, a user attaches a marker 60 to an object, such as a person undergoing surgery. The image generating unit 210 generates a first non-real-time image and a first real-time image including the object's anatomical information about a surrounding region including a position of the marker 60 when the object is in a first pose 40. Also, the image generating unit 210 generates a second real-time image of the object about the surrounding region when the object is in a second pose 50.

The term 'surrounding region' refers to a region including the position of the marker 60 and a region around the marker 60 such as a volume surrounding the marker 60. For example, when the object is subjected to prostatectomy, which is a surgical removal of part or all of a prostate gland, the surrounding region may refer to a region including a prostate gland of the object and a surrounding thereof.

The first pose 40, which is a pose taken by the object to obtain the first non-real-time image and the first real-time image, may be a pose before the object undergoes surgery. Also, the second pose 50 which is a pose taken by the object to obtain the second real-time image may be a pose after the first pose 40 in order for the object to undergo surgery. In detail, when the user of the robot performs prostatectomy on the object, the system 1 may generate the first non-real-time image and the first real-time image by having the object assume the first pose 40, and may generate the second real-time image by having the object change from the first pose 40 to the second pose 50.

The marker 60 may include a portion that is discernible in the first non-real-time image, the first real-time image, and the second real-time image, and is discernible even outside the object.

Figure 2:
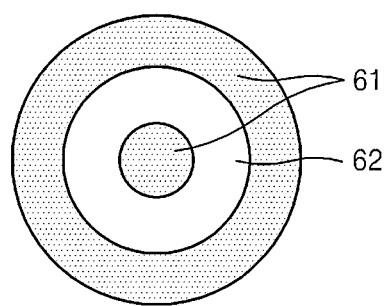
FIG. 2 is a view illustrating a marker according to an embodiment of the present disclosure.

FIG. 2 is a view illustrating the marker 60 according to an embodiment of the present disclosure.

The marker 60 may include, for example, a transparent portion 62 and opaque portions 61 in order to be discernible in the first non-real-time image, the first real-time image, and the second real-time image. In detail, since the marker 60 includes the transparent portion 62 and the opaque portions 61, a shape of the marker 60 may be perceived in the first non-real-time image, the first real-time image, and the second real-time image. Also, the marker 60 may be perceived even outside the object. In detail, the marker 60 may include a portion that may make a shape of the marker 60 perceptible even outside the object after the user attaches the marker 60 to the object.

Although the marker 60 has a circular shape in FIG. 2, the present embodiment is not limited thereto and the marker 60 may have any shape as long as the marker 60 includes a portion that is discernible in the first non-real-time image, the first real-time image, and the second real-time image and even outside the object.

Also, the marker 60 may be attached to the object's skin. For example, when diagnostic image information is used by displaying a pre-operative image, which is obtained before surgery, on another screen or a portion of a screen showing an endoscopic image, a viewpoint of an image during surgery and a viewpoint of the pre-operative image may not be the same due to the object's pose variation. In this case, since the user arbitrarily matches information of the image during surgery with the pre-operative image, the level of accuracy in the matching is often dependent upon the user's experience.

In the case of neurosurgery performed on the brain, a method of attaching a bone-implanted marker to an object's skull, obtaining a computed tomography (CT) or magnetic resonance (MR) image with the bone-implanted marker attached to the skull, and displaying the bone-implanted marker on a screen of a user during the neurological surgery by using a real-time marker detection system, such as a camera, has recently been suggested. However, the method has problems in that since the bone-implanted marker is attached to the object's skull, the method is uncomfortable and inconvenient to the object, the method is time-consuming, there is a risk of infection, surgical scars remain, and a recovery time is long.

However, according to the present embodiment, since the marker 60 is attached to the object's skin, the object's body may not be damaged and a viewpoint difference between images due to the object's pose variation may be compensated for.

Referring back to FIG. 1, the image generating unit 210 generates the first non-real-time image and the first real-time image when the object is in the first pose 40, and the image generating unit 210 generates the second real-time image when the object is in the second pose 50.

The first non-real-time image, the first real-time image, and the second real-time image may be generated by using the imaging apparatus 10 shown in FIG. 1. Although the image generating unit 210 and the imaging apparatus 10 are separated from each other in FIG. 1, the imaging apparatus 10 and the image generating unit 210 may operate as one apparatus. Assuming that the imaging apparatus 10 and the image generating unit 210 are separated from each other, the imaging apparatus 10 may obtain the object's anatomical information about the surrounding region including the position of the marker 60, convert the anatomical information into an electrical signal, and transmit the electrical signal to the image generating unit 210, and the image generating unit 210 may convert the electrical signal into the first non-real-time image, the first real-time image, and the second real-time image.

Also, the imaging apparatus 10 may include, for example, a first imaging apparatus 11, a second imaging apparatus 12, and a third imaging apparatus 13 respectively corresponding to the first non-real-time image, the first real-time image, and the second real-time image. Also, the image generating unit 210 may include, for example, a first image generating unit 211, a second image generating unit 212, and a third image generating unit 213 respectively corresponding to the first non-real-time image, the first real-time image, and the second real-time image.

The first non-real-time image may be any one of a CT image, a magnetic resonance (MR) image, a single-photon emission computed tomography (SPECT) image, and a positron emission tomography (PET) image. Also, each of the first real-time image and the second real-time image may be any one of an ultrasonic image, a photoacoustic tomography (PAT) image, and an X-ray image.

Each of the first non-real-time image, the first real-time image, and the second real-time image may be a two-dimensional (2D) image according to a type of the imaging apparatus 10 that captures each image. If images generated by the image generating unit 210 are a plurality of 2D images, the image generating unit 210 may generate the 2D images as 3D images by using any of well-known methods such as volume rendering.

The shift information obtaining unit 220 obtains shift information of the marker 60 when the object is changed from the first pose 40 to the second pose 50 by using the first real-time image and the second real-time image. For example, the shift information obtaining unit 220 may receive the first real-time image and the second real-time image from the image generating unit 210, and may obtain the shift information of the marker 60 by using the first real-time image and the second real-time image. The shift information of the marker 60 includes a shift direction in which the marker 60 is shifted and a shift amount by which the marker 60 is shifted.

Figure 3:
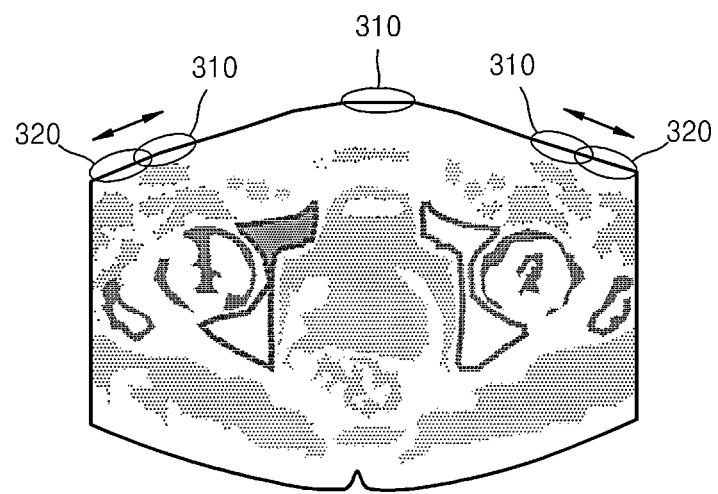
FIG. 3 is a view illustrating an example where the marker is shifted when an object is changed from a first pose to a second pose, according to an embodiment of the present disclosure.

FIG. 3 is a view for explaining an example where the marker 60 (see FIG. 1) is shifted when the object is changed from the first pose 40 (see FIG. 1) to the second pose 50 (see FIG. 1), according to an embodiment of the present disclosure.

The marker 60 (see FIG. 1) attached to the object's skin may be shifted when the object's pose is changed. For example, when the object is changed from the first pose 40 (see FIG. 1) to the second pose 50 (see FIG. 1), as shown in FIG. 1, a position of the skin may be changed due to an external force such as gravity and thus the marker 60 (see FIG. 1) may be shifted.

In detail, assuming that the marker 60 (see FIG. 1) is at a position 310 when the object is in the first pose 40 (see FIG. 1), when the object is changed from the first pose 40 to the second pose 50 (see FIG. 1), the marker 60 may be shifted to a position 320 due to an external force such as gravity. Although the marker 60 is shifted from the position 310 to the position 320 in FIG. 3, the present embodiment is not limited thereto. Also, although the number of markers 60 is 3 in FIG. 3, the present embodiment is not limited thereto.

Referring back to FIG. 1, the shift information obtaining unit 220 may include, for example, a first pose relationship specifying unit 221, a second pose relationship specifying unit 222, and a shift amount and shift direction calculating unit 223. Each of the first pose relationship specifying unit 221, the second pose relationship specifying unit 222, and the shift amount and shift direction calculating unit 223 of the shift information obtaining unit 220 may correspond to one or more processors. Each processor may be embodied as an array of logic gates, and a combination of a general-purpose microprocessor and a memory storing a program executable by the general-purpose microprocessor. Also, it would be understood by one of ordinary skill in the art that the processor may be embodied as another type of hardware.

The first pose relationship specifying unit 221 determines a point at which a value measured in data included in the first real-time image exceeds a threshold value and specifies a first pose relationship between the point determined by the first pose relationship specifying unit 221 and the marker 60. The measured value may be, but is not limited to, a brightness value of pixels constituting the first real-time image.

For example, when the first real-time image is an ultrasound elastography image, the measured value may be a value indicating a stiffness of a tissue included in the first real-time image.

For example, when the first real-time image is an ultrasonic image, the fact that a surface tissue of an organ has high echogenicity to bounce ultrasound may be used. In detail, the first pose relationship specifying unit 221 may determine a point at which a brightness value exceeds a threshold value by using the fact that a surface tissue of a specific organ appears brighter in the ultrasonic image. The threshold value may be determined directly by the user, for example, a medical specialist, in the object's medical image, or may be determined automatically without the user's intervention by the first pose relationship specifying unit 221.

The point at which the brightness value exceeds the threshold value may be a point that is selected in a tissue having a fixed position irrespective of the object's pose variation from among tissues in the body included in the first real-time image. For example, a tissue such as bone or blood vessels has a fixed position irrespective of the object's pose variation. In detail, a tissue such as bone or blood vessels may be located at a fixed position in the first real-time image and the second real-time image irrespective of the object's pose variation. For example, the first pose relationship specifying unit 221 may determine a point of a bone having a fixed position irrespective of the object's pose variation where a brightness value exceeds a threshold value in the first real-time image.

The second pose relationship specifying unit 222 selects a point corresponding to the point determined in the first real-time image on the second real-time image, and specifies a second pose relationship between the point selected by the second pose relationship specifying unit 222 and the marker 60.

As described above, since the point determined by the first pose relationship specifying unit 221 is a point that is selected in a tissue having a fixed position irrespective of the object's pose variation, the point selected by the second pose relationship specifying unit 222 also corresponds to the point in the tissue having the fixed position irrespective of the object's pose variation.

Also, the point determined by the first pose relationship specifying unit 221 or the second pose relationship specifying unit 222 may be a point obtained by segmenting a surface of the tissue having the fixed position in the first real-time image or the second real-time image into a plurality of pieces and selecting a piece from among the plurality of pieces. The term 'fixed position' refers to a position which is fixed irrespective of the object's pose variation.

Figure 4A:
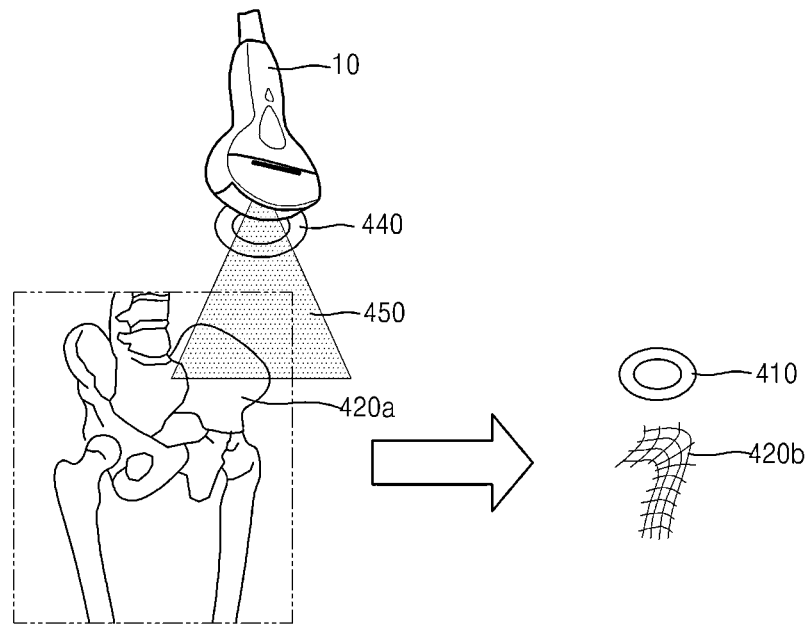
FIGS. 4A and 4B are views for respectively explaining operations of a first pose relationship specifying unit and a second pose relationship specifying unit, according to an embodiment of the present disclosure.
Figure 4B:
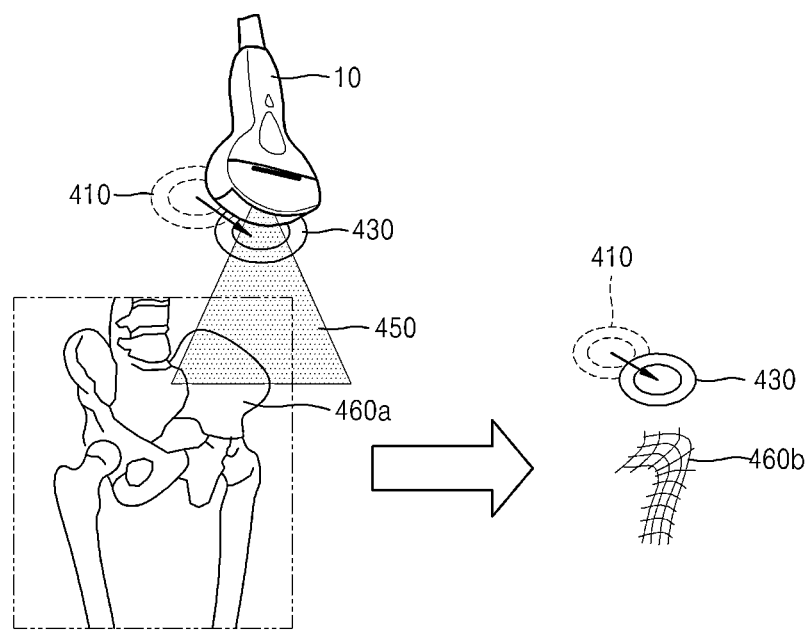

FIGS. 4A through 4B are views for respectively explaining operations of the first pose relationship specifying unit 221 (see FIG. 1) and the second pose relationship specifying unit 222 (see FIG. 1), according to an embodiment of the present disclosure.

Referring to FIG. 4A, a process performed by the first pose relationship specifying unit 221 (see FIG. 1) to segment a surface of a tissue in the first real-time image will be explained. The first real-time image may include a position of a marker 440 and a surrounding 450. It is assumed that a pelvis bone 420a of the object is included in the surrounding 450. The first pose relationship specifying unit 221 may select a tissue of the pelvis bone 420a of the object in the first real-time image and segment a surface 420b of the tissue of the pelvis bone 420a. When the first real-time image is an ultrasonic image, the first pose relationship specifying unit 221 may segment the surface 420b of the tissue of the pelvis bone 420a by using the fact that a surface tissue of the pelvis bone 420a appears brighter in the ultrasonic image.

The first pose relationship specifying unit 221 (see FIG. 1) selects a point on the surface 420b of the tissue of the pelvis bone 420a which is segmented.

Referring to FIG. 4B, a process performed by the second pose relationship specifying unit 222 (see FIG. 1) to segment a surface of a tissue in the second real-time image will be explained. A position of the marker 60 in the second real-time image, which is an image generated when the object is in the second pose 50, is different from a position of the marker 60 in the first real-time image. For example, assuming that a position of the marker 60 in the first real-time image is 410, a position of the marker 60 in the second real-time image may be 430, which is different from the position 410. The second pose relationship specifying unit 222 (see FIG. 1) selects a tissue 460a corresponding to a tissue (for example, the tissue of the pelvis bone 420a) whose surface is segmented by the first pose relationship specifying unit 221 (see FIG. 1) in the second real-time image, and segments a surface 460b of the selected tissue 460a. A process performed by the second pose relationship specifying unit 222 (see FIG. 1) to segment the surface 460b of the tissue 460a may be the same as a process performed by the first pose relationship specifying unit 221 (see FIG. 1) to segment the surface 420b of the tissue.

The second pose relationship specifying unit 222 (see FIG. 1) selects in the second real-time image a point corresponding to the point selected by the first pose relationship specifying unit 221.

Referring back to FIG. 1, the first pose relationship specifying unit 221 specifies a first pose relationship between the marker 60 and the point determined in the first real-time image. For example, the first pose relationship specifying unit 221 may specify a first pose relationship by representing positions of the point and the marker 60 in the first real-time image with coordinates.

Also, the second pose relationship specifying unit 222 specifies a second pose relationship between the point determined in the second real-time image and the marker 60. For example, the second pose relationship specifying unit 222 may specify a second pose relationship by representing positions of the point and the marker 60 in the second real-time image with coordinates.

Figure 5A:
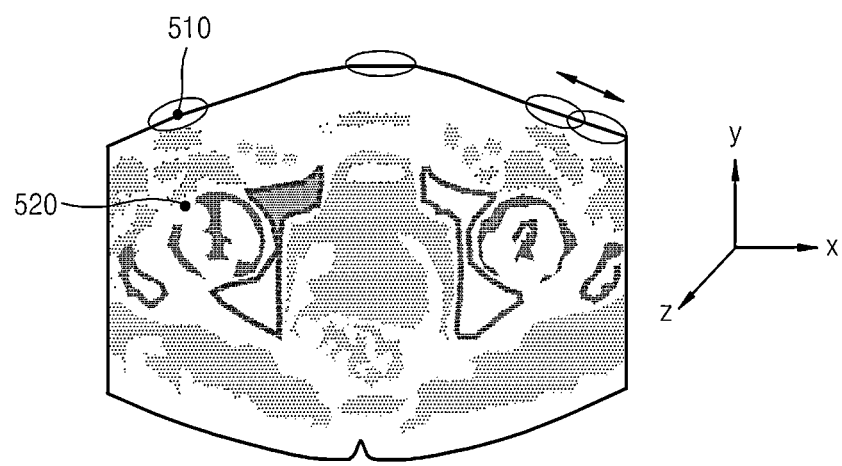
FIG. 5A is a view for explaining a process performed by the first pose relationship specifying unit to represent positions of a point and a position of the marker on a first real-time image with coordinates, according to an embodiment of the present disclosure.

FIG. 5A is a view for explaining a process performed by the first pose relationship specifying unit 221 (see FIG. 1) to represent positions of a point and the marker 60 in the first real-time image with coordinates, according to an embodiment of the present disclosure.

The first pose relationship specifying unit 221 (see FIG. 2) sets a coordinate axis with its origin at an arbitrary point in the first real-time image. Next, the first pose relationship specifying unit 221 (see FIG. 1) calculates coordinates of a determined point 520 and a point corresponding to a center 510 of the marker 60 relative to the origin. For example, when the first real-time image is a 3D image, the first pose relationship specifying unit 221 (see FIG. 1) may calculate coordinates of the determined point 520 as P(x0, y0, z0), and coordinates of the point corresponding to the center 510 of the marker 60 as M1(x1, y1, z1). The first pose relationship specifying unit 221 (see FIG. 1) may specify a first pose relationship by calculating a vector $\vec{A}$ between the coordinates P(x0, y0, z0) and the coordinates M1(x1, y1, z1). However, as long as a pose relationship between the determined point 520 and the point corresponding to the center 510 of the marker 60 is specified, the present embodiment is not limited to a method of calculating the vector $\vec{A}$.

The second pose relationship specifying unit 222 (see FIG. 1) may determine coordinates of a determined point and a point corresponding to a center of the marker 60 in the second real-time image in the same manner as that used by the first pose relationship specifying unit 221 (see FIG. 1). In detail, the second pose relationship specifying unit 222 (see FIG. 1) calculates coordinates of the determined point and the point corresponding to the center of the marker 60 in the second real-time image relative to an origin of a coordinate axis and a coordinate axis corresponding to the origin and the coordinate axis set by the first pose relationship specifying unit 221 (see FIG. 1). For example, when the second real-time image is a 3D image, the second pose relationship specifying unit 222 may calculate coordinates of the determined point as P(x0, y0, z0), and coordinates of the point corresponding to the center of the marker 60 as M2(x2, y2, z2). The second pose relationship specifying unit 222 may specify a second pose relationship by calculating a vector $\vec{B}$ between the coordinates P(x0, y0, z0) and the coordinates M2(x2, y2, z2). However, as long as a pose relationship between the determined point and the point corresponding to the center of the marker 60 is specified, the present embodiment is not limited to a method of calculating the vector $\vec{B}$.

Referring back to FIG. 1, the shift amount and shift direction calculating unit 223 calculates a shift direction and a shift amount of the marker 60 according to the object's pose variation by using the first pose relationship and the second pose relationship. For example, the shift amount and the shift direction calculating unit 223 receives information about the first pose relationship and the second pose relationship from the first pose relationship specifying unit 221 and the second pose relationship specifying unit 222 and calculates a shift direction and a shift amount of the marker 60.

Figure 5B:
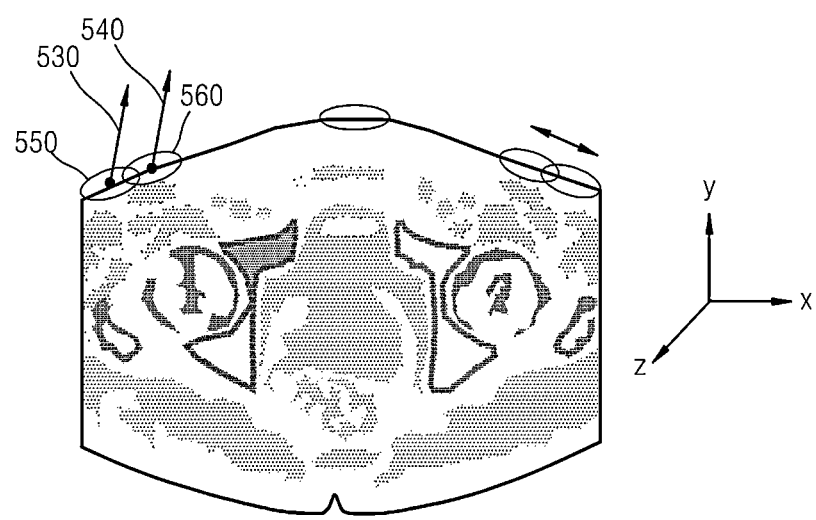
FIG. 5B is a view for explaining an operation of a shift amount and shift direction calculating unit, according to an embodiment of the present disclosure.

FIG. 5B is a view for explaining an operation of the shift amount and shift direction calculating unit 223 (see FIG. 1), according to an embodiment of the present disclosure.

For example, the shift amount and shift direction calculating unit 223 (see FIG. 1) may receive a first pose relationship $\vec{A}$ 540 obtained by the first pose relationship specifying unit 221 (see FIG. 1) and a second pose relationship $\vec{B}$ 530 obtained by the second pose relationship specifying unit 222 (see FIG. 1), and may calculate a shift direction and a shift amount of the marker 60 when the marker 60 is shifted from a position 560 to a position 550 based on the first pose relationship $\vec{A}$ 540 and the second pose relationship $\vec{B}$ 530.

Referring back to FIG. 1, the image correcting unit 230 corrects the first non-real-time image by reflecting shift information of the marker 60. For example, the image correcting unit 230 corrects the first non-real-time image by reflecting the shift information of the marker 60 (that is, the shift direction and the shift amount of the marker 60) received from the shift information obtaining unit 220. The expression 'correcting the first non-real-time image' refers to correcting the first non-real-time image such that the anatomical information about the surrounding region including the position of the marker 60 in the first non-real-time image may include anatomical information when the object is in the second pose 50. The expression 'anatomical information' refers to information including not only structures of tissues in the body but also shift directions and shift amounts of the tissues.

When the object's pose varies, positions of tissues in the body may be changed due to an external force such as gravity. In detail, except a tissue such as bone or blood vessels having a fixed position irrespective of the object's pose variation, positions of other soft tissues may be changed to some extent according to the object's pose variation. Accordingly, the image correcting unit 230 calculates a shift direction and a shift amount of each of the tissues in the body corresponding to the shift information of the marker 60 attached to the object's skin, that is, the shift direction and the shift amount of the marker 60, and corrects the first non-real-time image based on the shift direction and the shift amount to obtain a corrected first non-real-time image.

Also, the image correcting unit 230 may include an evaluation unit. The evaluation unit may determine whether the first non-real-time image is accurately corrected. For example, the evaluation unit may set a plurality of points in the corrected first non-real-time image and the first non-real-time image, measure a distance between corresponding points of the corrected first non-real-time image and the first non-real-time image, and determine whether the distance is equal to or less than a predetermined error value. The predetermined error value may be a value set by the user, or a value automatically set by the evaluation unit without the user's intervention. When the evaluation unit determines that the distance between the corresponding points exceeds the predetermined error value, the units constituting the image processing apparatus 20 perform their aforesaid operations again.

As the image correcting unit 230 corrects the first non-real-time image, an image indicating positions of tissues in the body when the object is in the second pose 50 may be obtained without generating another image. Accordingly, even when a pose taken by the object to obtain an image (for example, a CT image or an MR image) including anatomical information of the tissues in the body of the object and a pose taken by the object during surgery are different from each other, the image correcting unit 230 may obtain an accurate diagnostic image by compensating for changes in positions of the tissues in the body and the skin of the object.

Figure 6:
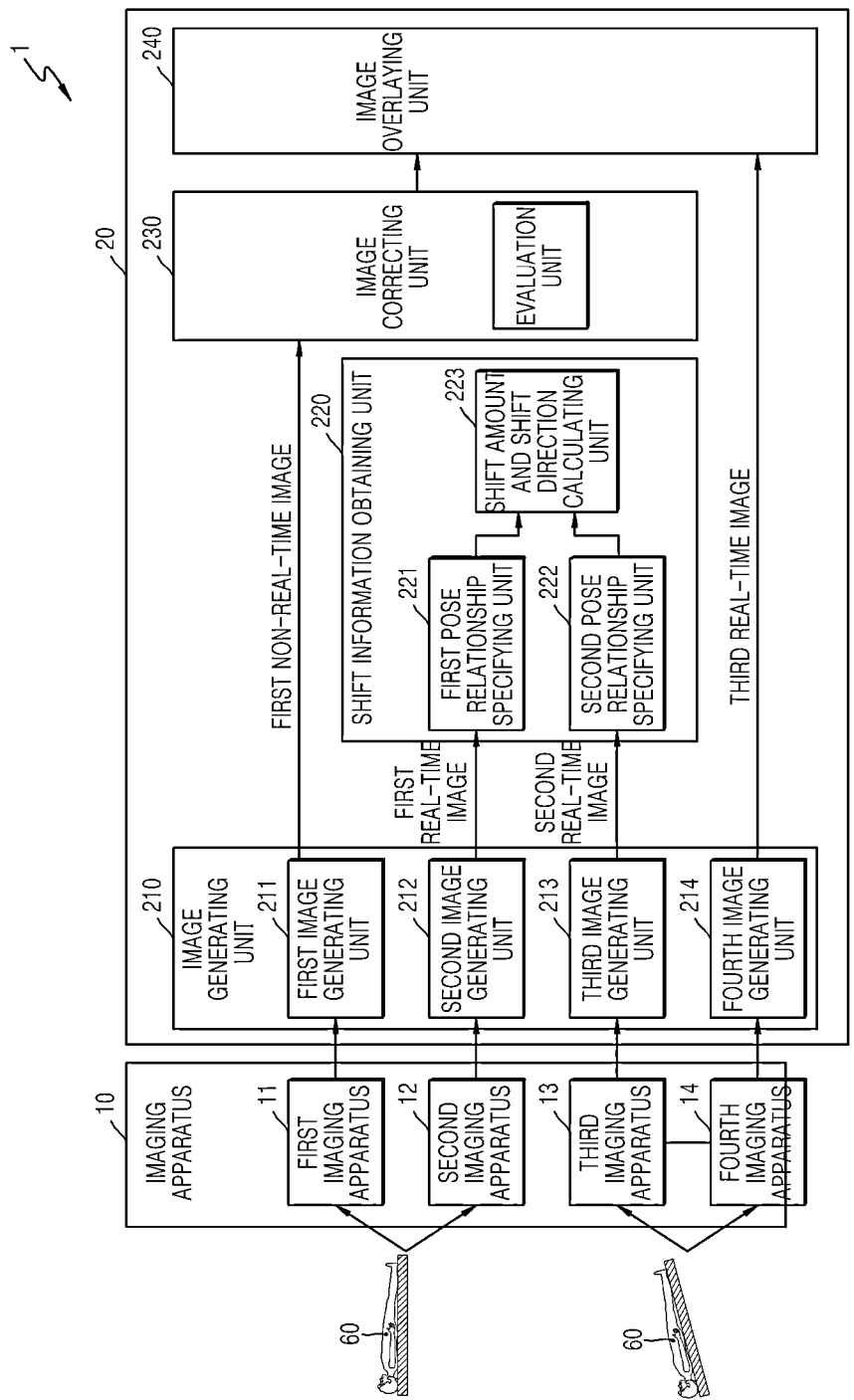
FIG. 6 is a block diagram illustrating the system according to another embodiment of the present disclosure.

FIG. 6 is a block diagram illustrating the system 1 according to another embodiment of the present disclosure.

The system 1 may include, for example, the imaging apparatus 10 and the image processing apparatus 20. The image processing apparatus 20 may include, for example, the image generating unit 210, the shift information obtaining unit 220, the image correcting unit 230, and an image overlaying unit 240.

As shown, the system 1 of FIG. 6 illustrates only elements related to the present embodiment. However, it would be understood by one of ordinary skill in the art that the system 1 may further include general-purpose elements other than the elements illustrated in FIG. 6.

Also, each of the image generating unit 210, the shift information obtaining unit 220, the image correcting unit 230, and the image overlaying unit 240 of the image processing apparatus 20 of FIG. 6 may correspond to one or more processors. Each processor may be embodied as an array of logic gates, and a combination of a general-purpose microprocessor and a memory storing a program executable in the general-purpose microprocessor. Also, it would be understood by one of ordinary skill in the art that the processor may be embodied as another type of hardware.

Operations of the shift information obtaining unit 220 and the image correcting unit 230 of the image processing apparatus 20 are the same as those described above.

The image generating unit 210 generates a third real-time image, which is an image indicating the surrounding region when the object is in the second pose 50. For example, a fourth image generating unit 214 included in the image generating unit 210 may generate a third real-time image including anatomical information about the surrounding region by using the imaging apparatus 10 inserted into the body of the object when the object is in the second pose.

The imaging apparatus 10, which is an imaging apparatus inserted into the body of the object, may include a fourth imaging apparatus 14 that is different from the first through third imaging apparatuses 11, 12, and 13 respectively generating the first non-real-time image, the first real-time image, and the second real-time image, as shown in FIG. 6. In detail, the first imaging apparatus 11, the second imaging apparatus 12, and the third imaging apparatus 13 which respectively generate the first non-real-time image, the first real-time image, and the second real-time image may be imaging apparatuses provided outside the body of the object, and the fourth imaging apparatus 14 that generates the third real-time image may be an imaging apparatus inserted into the body of the object. The fourth imaging apparatus 14 may be, but is not limited to, an endoscope such as a laparoscope.

Although the image generating unit 210 and the imaging apparatus 10 are separated from each other in FIG. 6, the imaging apparatus 10 and the image generating unit 210 may operate as one apparatus as described above.

The image generating unit 210 (especially, the fourth image generating unit 214) transmits the third real-time image to the image overlaying unit 240.

The image overlaying unit 240 detects a third pose relationship between the imaging apparatus 10 and the marker 60, and overlays the third real-time image with a corrected image by using the third pose relationship. The expression 'corrected image' refers to the corrected first non-real-time image, and is received from the image correcting unit 230.

In order to detect the third pose relationship, the system 1 may further include an additional position measuring apparatus. An example where the image overlaying unit 240 detects the third pose relationship by using a position measuring apparatus will be explained below, but the present embodiment is not limited thereto.

Figure 14:
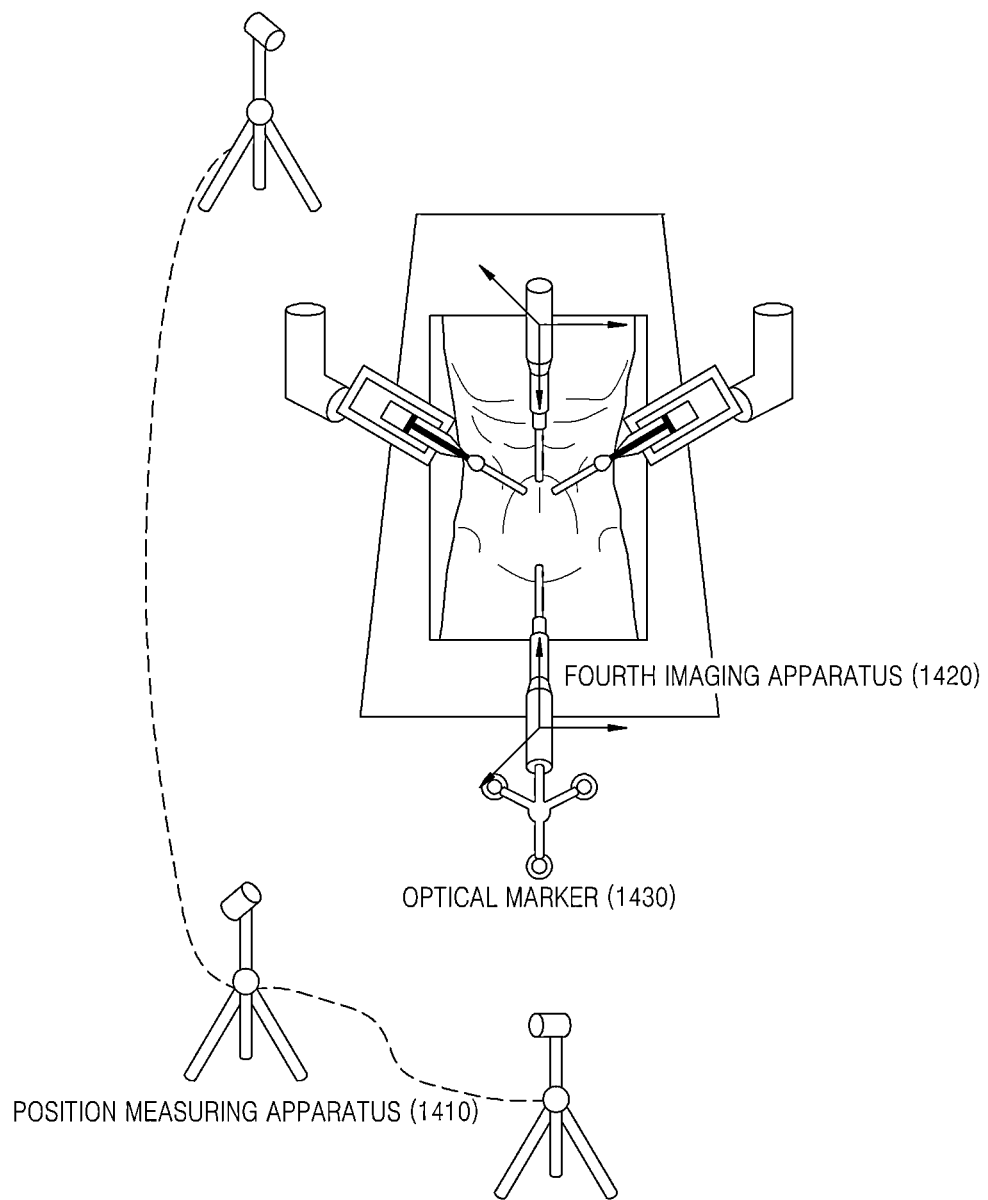
FIG. 14 is a view illustrating a position measuring apparatus and the fourth imaging apparatus, according to an embodiment of the present disclosure.

FIG. 14 is a view illustrating a position measuring apparatus 1410 and the fourth imaging apparatus 14, according to an embodiment of the present disclosure.

First, the image overlaying unit 240 (see FIG. 6) detects a pose relationship between the position measuring apparatus 1410 and the marker 60 (see FIG. 6). Next, the image overlaying unit 240 (see FIG. 6) detects a pose relationship between the position measuring apparatus 1410 and the fourth imaging apparatus 14 (see FIG. 6). The pose relationship between the position measuring apparatus 1410 and the fourth imaging apparatus 14 (see FIG. 6) may be detected by using an additional marker 1430 attached to the fourth imaging apparatus 14 (see FIG. 6). The marker 1430 attached to the fourth imaging apparatus 14 (see FIG. 6) may reflect external infrared rays and may directly emit infrared rays.

For example, when infrared rays emitted by the position measuring apparatus 1410 reach the marker 1430 attached to the fourth imaging apparatus 14 (see FIG. 6), the fourth imaging apparatus 14 (see FIG. 6) may reflect the infrared rays. The image overlaying unit 240 (see FIG. 6) may detect the pose relationship between the position measuring apparatus 1410 and the fourth imaging apparatus 14 (see FIG. 6) by measuring a time at which and a direction in which the infrared rays are reflected to the position measuring apparatus 1410. Alternatively, the image overlaying unit 240 may detect the pose relationship between the position measuring apparatus 1410 and the fourth imaging apparatus 14 (see FIG. 6) by measuring a time at which and a direction in which the infrared rays directly emitted by the marker 1430 attached to the fourth imaging apparatus 14 (see FIG. 6) reach the position measuring apparatus 1410.

Referring back to FIG. 6, the pose relationship between the position measuring apparatus 1410 (see FIG. 14) and the fourth imaging apparatus 14 detected by the image overlaying unit 240 does not include a pose relationship between a lens included in the fourth imaging apparatus 14 and the marker 1430 (see FIG. 14) attached to the fourth imaging apparatus 14. To be exact, the third real-time image generated by using the fourth imaging apparatus 14 is an image generated by using the lens included in the fourth imaging apparatus 14. Accordingly, it may be difficult for the image overlaying unit 240 to accurately overlay the third real-time image with the corrected image by using only the pose relationship between the position measuring apparatus 1410 (see FIG. 14) and the marker 1430 (see FIG. 14) attached to the fourth imaging apparatus 14. Accordingly, a pose relationship between the marker 1430 (see FIG. 14) attached to the fourth imaging apparatus 14 and the lens of the fourth imaging apparatus 14 has to be detected.

The following description will be explained assuming that the fourth imaging apparatus 14 is, but is not limited to, a stereo laparoscope.

First, the position measuring apparatus 1410 (see FIG. 14) calculates a 3D distance between the position measuring apparatus 1410 (see FIG. 14) and a rectification pattern 1010 by using the rectification pattern 1010. Also, the fourth imaging apparatus 14 calculates a 3D distance between left and right lenses of the fourth imaging apparatus 14 and the rectification pattern 1010 by using the rectification pattern 1010.

Figure 10A:
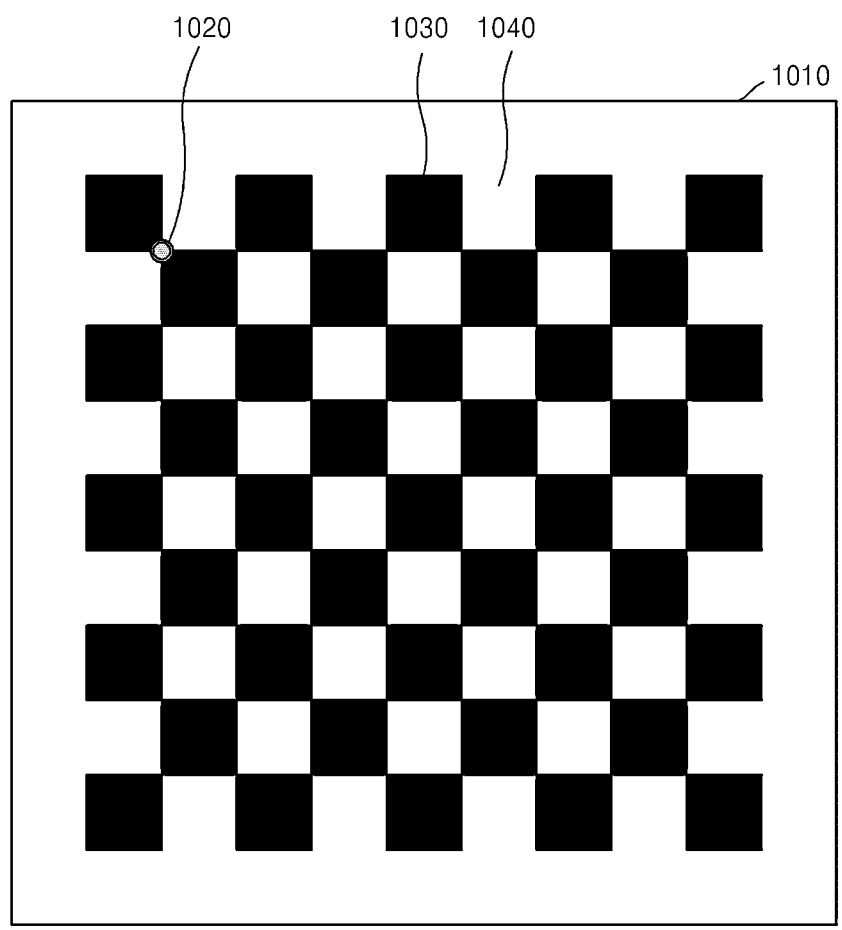
FIGS. 10A and 10B are views illustrating a rectification pattern and an indicator, according to an embodiment of the present disclosure.
Figure 10B:
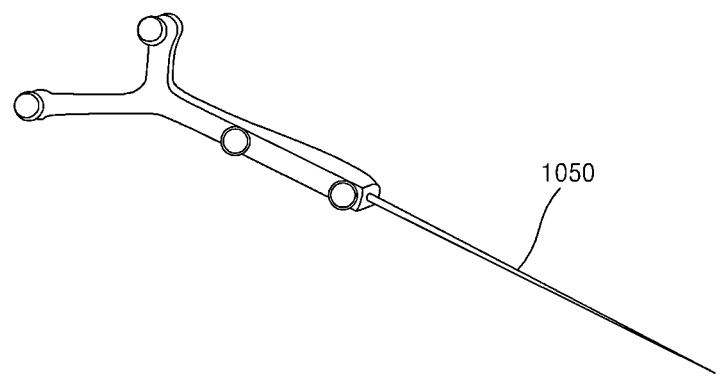

FIGS. 10A through 10B are views illustrating the rectification pattern 1010 and an indicator 1050, according to an embodiment of the present disclosure.

Referring to FIG. 10A, assuming that the rectification pattern 1010 exists outside the fourth imaging apparatus 14 (see FIG. 6) and the left and right lenses of the fourth imaging apparatus 14 (see FIG. 6) see a predetermined point 1020 of the rectification pattern 1010, the fourth imaging apparatus 14 (see FIG. 6) may calculate a 3D distance between the left and right lenses of the fourth imaging apparatus 14 (see FIG. 6) and the rectification pattern 1010. Also, the position measuring apparatus 1410 (see FIG. 14) may calculate a 3D distance between the position measuring apparatus 1410 (see FIG. 14) and the rectification pattern 1010.

The predetermined point 1020 may be, but is not limited to, a point at which black squares 1030 and white squares 1040 constituting the rectification pattern 1010 intersect each other. Alternatively, the predetermined point 1020 may be, but is not limited to, a point indicated by the user using the indicator 1050 (see FIG. 10B).

Corresponding points of 3D data of a predetermined point measured in a coordinate system using the fourth imaging apparatus 14 and 3D coordinate data measured in a coordinate system using the position measuring apparatus 1410 (see FIG. 14) may be defined as described above. Rigid transformation between the corresponding points may be performed by using singular value decomposition (SVD) (see Equations 8 through 14) as will be described below.

First, the fourth imaging apparatus 14 (see FIG. 6) calculates a 3D distance between the left and right lenses of the fourth imaging apparatus 14 (see FIG. 6) and the predetermined point 1020 by using triangulation. The expression '3D distance' may refer to a position vector of the predetermined point 1020. A specific algorithm for triangulation is well known to one of ordinary skill in the art, and thus will be explained briefly.

Figure 11:
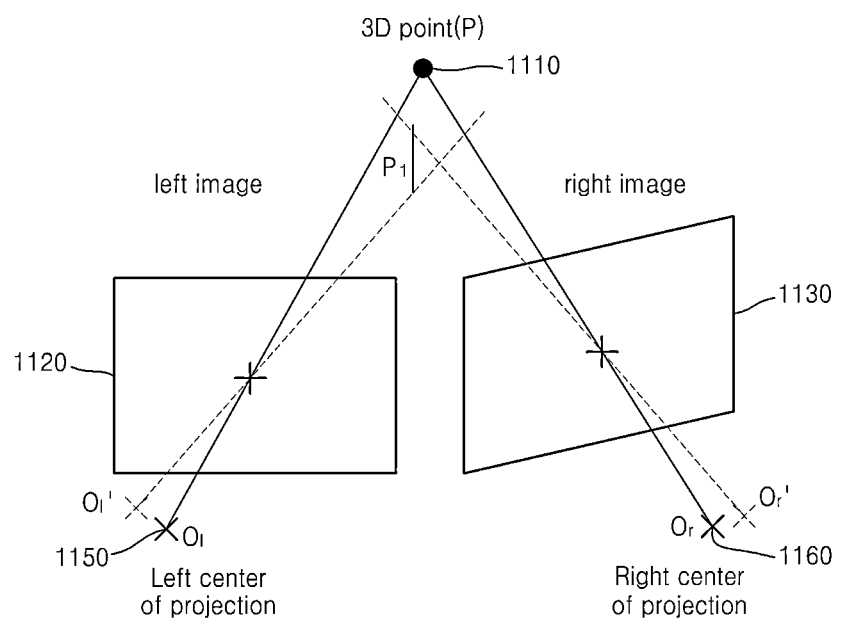
FIG. 11 is a view for explaining triangulation according to an embodiment of the present disclosure.

FIG. 11 is a view for explaining triangulation according to an embodiment of the present disclosure.

Referring to FIG. 11, a point P 1110 of a rectification pattern, a left image 1120 of the predetermined point 1020 (see FIG. 10A) generated by using the left lens of the fourth imaging apparatus 14 (see FIG. 6), a right image 1130 of the predetermined point 1020 (see FIG. 10A) generated by using the right lens of the fourth imaging apparatus 14 (see FIG. 6), and a center 1150 where is 1140? of the left lens and a center 1160 of the right lens are illustrated.

When it is assumed that a position vector of the point P 1110 based on a coordinate axis of the left lens is $\vec{P}_l=[X_l\ Y_l\ Z_l]$ and a position vector of the point P 1110 based on a coordinate axis of the right lens is $\vec{P}_r=[X_r\ Y_r\ Z_r]$, a relationship between the position vectors $\vec{P}_l=[X_l\ Y_l\ Z_l]$ and $\vec{P}_r=[X_r\ Y_r\ Z_l]$ may be defined by Equation 1.

$$\vec{P}_l = R\vec{P}_r + T \quad (1),$$

where R is a rotation matrix and T denotes a translation vector. The rotation matrix R and the translation vector T may be used to convert coordinates of the right lens into coordinates of the left lens.

When a vector of the predetermined point P 1110 on the left image 1120 is $\vec{p}_l=\vec{P}_l/Z_l=[x_l\ y_l\ 1]^T$ and a vector of the predetermined point P 1110 on the right image 1130 is $\vec{p}_r=\vec{P}_r/Z_r=[x_r\ y_r\ 1]^T$, triangulation involves obtaining $\vec{P}_l$ and $\vec{P}_r$ from $\vec{p}_l$ and $\vec{p}_r$. Accordingly, Equation 1 may be re-expressed as Equation 2.

$$Z_l\vec{p}_l = Z_r R\vec{p}_r + T \rightarrow \begin{bmatrix} -R\vec{p}_r & \vec{p}_l \end{bmatrix} \begin{bmatrix} Z_r \\ Z_l \end{bmatrix} = T, \quad (2)$$

where when it is assumed that $A=[-R\vec{p}_r\ \vec{p}_l]$, a least square solution of Equation 2 may be defined by Equation 3.

$$\begin{bmatrix} Z_r \\ Z_l \end{bmatrix} = (A^T A)^{-1} A^T T. \quad (3)$$

The fourth imaging apparatus 14 (see FIG. 6) may obtain coordinates corresponding to a position of the predetermined point P 1110 by using Equation 3.

Referring back to FIG. 10A, the fourth imaging apparatus 14 (see FIG. 6) may calculate a 3D distance between the left and right lenses of the fourth imaging apparatus 14 (see FIG. 6) and the predetermined point 1020 by calibrating the fourth imaging apparatus 14 (see FIG. 6) and rectifying two images. The expression '3D distance' may refer to a position vector of the predetermined point 1020. The expression 'two images' refer to a left image of the predetermined point 1020 generated by using the left lens of the fourth imaging apparatus 14 (see FIG. 6) and a right image of the predetermined point 1020 generated by using the right lens of the fourth imaging apparatus 14 (see FIG. 6).

Figure 12:
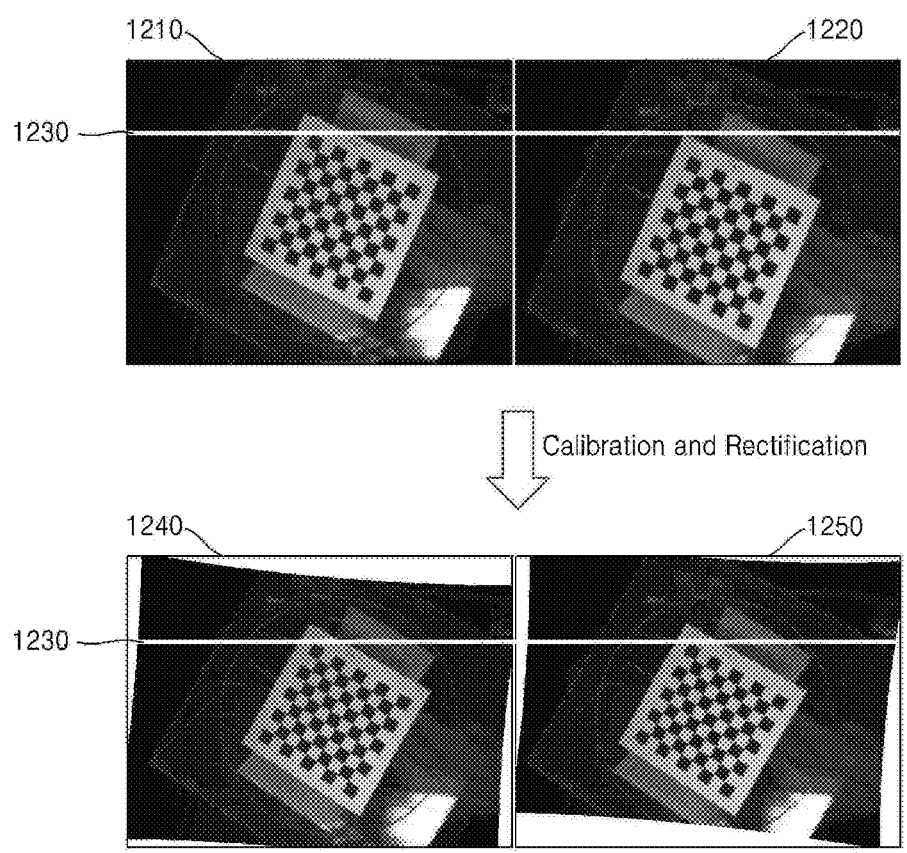
FIG. 12 is a view for explaining an example where a fourth imaging apparatus is calibrated and images are rectified by using an image of the rectification pattern, according to an embodiment of the present disclosure.

FIG. 12 is a view for explaining an example where the fourth imaging apparatus 14 (see FIG. 6) is calibrated and two images are rectified by using an image of the rectification pattern 1010 (see FIG. 10A), according to an embodiment of the present disclosure.

Referring to FIG. 12, the two images refer to a left image 1210 generated by using the left lens of the fourth imaging apparatus 14 and a right image 1220 generated by using the right lens of the fourth imaging apparatus 14 before calibration and rectification are performed. Before calibration and rectification are performed, the rectification pattern 1010 (see FIG. 10A) included in the left image 1210 and the rectification pattern 1010 (see FIG. 10A) included in the right image 1220 are not correspondingly aligned with each other with respect to a predetermined reference line 1230.

A left image 1240 and a right image 1250 are obtained after calibration and rectification are performed. After calibration and rectification are performed, the rectification pattern 1010 (see FIG. 10A) included in the left image 1240 and the rectification pattern 1010 (see FIG. 10A) included in the right image 1250 is correspondingly aligned with each other with respect to the predetermined reference line 1230.

A method of calibrating the fourth imaging apparatus 14 is well known to one of ordinary skill in the art, and thus an explanation thereof will not be given.

After the fourth imaging apparatus 14 is calibrated, the fourth imaging apparatus 14 (see FIG. 6) rectifies two images. The term 'rectification' refers to a process of matching an x-axis of the coordinate axis of the left lens of the fourth imaging apparatus 14 with an x-axis of the coordinate axis of the right lens of the fourth imaging apparatus 14. For example, a coordinate system with a center of the right lens as an origin may be transformed by fixing a coordinate system with a center of the left lens as an origin and obtaining a rotation amount and a translation amount by which the coordinate system with the center of the right lens as the origin is rotated and translated relative to the coordinate system with the center of the left lens as the origin. Accordingly, x-axes of the left and right lenses are matched with each other.

An algorithm for rectification performed by the fourth imaging apparatus 14 is well known to one of ordinary skill in the art, and thus will be explained below briefly.

Figure 13:
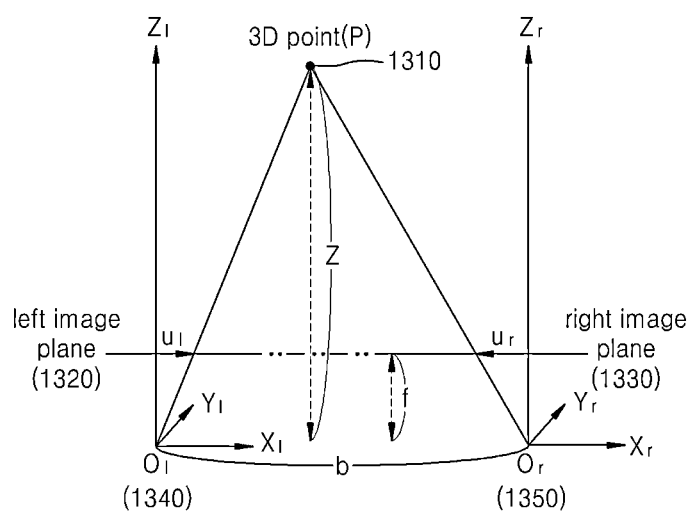
FIG. 13 is a view illustrating that after the fourth imaging apparatus performs calibration and rectification, X coordinates of a left camera and a right camera included in the fourth imaging apparatus are horizontally matched with each other, according to an embodiment of the present disclosure.

FIG. 13 is a view illustrating that after the fourth imaging apparatus 14 (see FIG. 6) performs calibration and rectification, X coordinates of a left camera and a right camera included in the fourth imaging apparatus 14 (see FIG. 6) are horizontally matched with each other, according to an embodiment of the present disclosure.

Coordinate components of a point P 1310 of the rectification pattern 1010 (see FIG. 10A) obtained by using a coordinate axis (hereinafter, referred to as a 'left coordinate axis') with a center 1340 of the left lens of the fourth imaging apparatus 14 (see FIG. 6) as an origin and a coordinate axis (hereinafter, referred to as a 'right coordinate axis') with a center 1350 of the right lens of the fourth imaging apparatus 14 (see FIG. 6) with an origin are shown in Equation 4.

$$u_l = f\frac{X_l}{Z_l} \rightarrow X_l = u_l\frac{Z_l}{f}\ \text{and}\ Y_l = v_l\frac{Z_l}{f} \quad (4)$$

$$u_l = f\frac{X_l}{Z_l} \rightarrow X_l = u_l\frac{Z_l}{f}\ \text{and}\ Y_l = v_l\frac{Z_l}{f},$$

where $X_l$, $Y_l$, and $Z_l$ are coordinate components of the point P 1310 on the left coordinate axis, $X_r$, $Y_r$, and $Z_r$ are coordinate components of the point P 1310 on the right coordinate axis, f is a focal length of a lens, $u_l$ and $v_l$ are respectively a horizontal component and a vertical component of pixels of an image 1320 captured by using the left lens of the fourth imaging apparatus 14 (see FIG. 6), and $u_r$ and $v_r$ are respectively a horizontal component and a vertical component of pixels of an image 1330 captured by using the right lens of the fourth imaging apparatus 14 (see FIG. 6).

Since the image 1320 captured by using the left lens of the fourth imaging apparatus 14 (see FIG. 6) and the image 1330 captured by using the right lens of the fourth imaging apparatus 14 (see FIG. 6) are parallel to an x-axis, the x-axis component $X_l$ of the left coordinate axis and the x-axis component $X_r$ of the right coordinate axis have the following relationship as shown in Equation 5.

$$X_r = X_l - b \quad (5),$$

where b is a distance between the center 1340 of the left lens of the fourth imaging apparatus 14 (see FIG. 6) and the center 1350 of the right lens of the fourth imaging apparatus 14 (see FIG. 6).

When a distance between the horizontal components $u_l$ and $u_r$ is defined as d (that is, when $d=u_l-u_r$), by using $Z_l=Z_r=Z$ and Equation 5, Equation 4 may be re-expressed as Equation 6.

$$u_r \frac{Z}{f} = u_l \frac{Z}{f} - b \rightarrow Z = \frac{bf}{d}. \quad (6)$$

When z of Equation 6 is input to Equation 4 and the center $O_l$ 1340 of the left lens of the fourth imaging apparatus 14 (see FIG. 6) is defined as a center of a world coordinate system of the fourth imaging apparatus 14 (see FIG. 6), coordinate components (that is, X, Y, and Z) on the world coordinate system of the point P 1310 may be defined by Equation 7.

$$X = u_l \frac{b}{d}, Y = v_l \frac{b}{d} \text{ and } Z = f \frac{b}{d}. \quad (7)$$

By using Equation 7, coordinates corresponding to a position of the point P 1310 of the fourth imaging apparatus 14 (see FIG. 6) may be obtained.

Referring back to FIG. 10A, there may be a difference between coordinates of the predetermined point 1020 calculated by the fourth imaging apparatus 14 (see FIG. 6) by using triangulation (that is, Equation 3) and coordinates of the predetermined point 1020 calculated by the fourth imaging apparatus 14 (see FIG. 6) by using calibration and image rectification (that is, Equation 7). In detail, when the fourth imaging apparatus 14 (see FIG. 6) calculates coordinates of the predetermined point 1020 by using triangulation, accurate coordinates of the predetermined point 1020 may be calculated but it takes a lot of time. Meanwhile, when the fourth imaging apparatus 14 (see FIG. 6) calculates coordinates of the predetermined point 1020 by using calibration and image rectification, it takes little time but there may be a slight error between a calculated position and an actual position of the predetermined point 1020.

Accordingly, the fourth imaging apparatus 14 (see FIG. 6) compensates for an error of coordinates calculated by using calibration and image rectification by using coordinates calculated by using triangulation. In detail, the fourth imaging apparatus 14 (see FIG. 6) calculates the rotation matrix R and the translation vector T by using singular value decomposition (SVD) based on coordinates of the predetermined point 1020 calculated by using Equation 7 and coordinates of the predetermined point 1020 calculated by using Equation 3. A specific algorithm for SVD is well known to one of ordinary skill in the art, and thus will be explained briefly.

First, when two sets P and Q of corresponding points are respectively $P=\{p_1, p_2, \ldots, p_n\}$ & $Q=\{q_1, q_2, \ldots, q_n\}$, the rotation matrix R and the translation vector T minimize Equation 8.

$$(R, T) = \underset{R,T}{\operatorname{argmin}} \sum_{i=1}^{n} w_i \|(Rp_i + T) - q_i\|^2, \quad (8)$$

where $w_i$ is a weight value for each pair of points, a condition $w_i>0$ is established, and n is an integer.

A process of calculating the rotation matrix R and the translation vector T includes the following five steps:

First, by using Equation 9, weighted centroids $\bar{p}$ and $\bar{q}$ of the sets P and Q are calculated.

$$\bar{p} = \frac{\sum_{i}^{n} w_i p_i}{\sum_{i}^{n} w_i}, \bar{q} = \frac{\sum_{i}^{n} w_i q_i}{\sum_{i}^{n} w_i}. \quad (9)$$

Next, by using the weighted centroids $\bar{p}$ and $\bar{q}$, centered vectors $x_i$ and $y_i$ are calculated as shown in Equation 10.

$$x_i = p_i - \bar{p}, y_i = q_i - \bar{q}, i=1,2,\ldots n \quad (10).$$

Next, by using the centered vectors $x_i$ and $y_i$, a covariance matrix H is calculated as shown in Equation 11.

$$H = \sum_{i}^{N} w_i x_i y_i^T. \quad (11)$$

Next, by using the covariance matrix H, an SVD is calculated as shown in Equation 12.

$$H = U \wedge V^T \quad (12).$$

Finally, by using a result of Equation 12, the rotation matrix R and the translation vector T are calculated as shown in Equation 13.

$$R = V \begin{pmatrix} 1 & & & \\ & \ddots & & \\ & & 1 & \\ & & & \det(VU^T) \end{pmatrix} U^T, \quad (13)$$

$$T = \bar{q} - R\bar{p}.$$

The fourth imaging apparatus 14 (see FIG. 6) calculates Xnew, Ynew, and Znew which are coordinate components obtained by compensating for errors of X, Y, and Z which are coordinate components calculated through calibration and image rectification as shown in Equation 14 by using the calculated rotation matrix R and the translation vector T.

$$\begin{bmatrix} X_{new} \\ Y_{new} \\ Z_{new} \end{bmatrix} = R \begin{bmatrix} X \\ Y \\ Z \end{bmatrix} + T. \quad (14)$$

Since the fourth imaging apparatus 14 (see FIG. 6) calculates a coordinate component obtained by compensating for an error of a coordinate component calculated through calibration and image rectification, an accurate position of an organ in the body of the object may be calculated without using triangulation, which takes a lot of time. In detail, since the position measuring apparatus 1410 (see FIG. 14) knows a rotation matrix and a translation vector to be used to convert a coordinate system of the fourth imaging apparatus 14 (see FIG. 6) into a coordinate system of the position measuring apparatus 1410 (see FIG. 14) with respect to the predetermined point 1020 of the rectification pattern 1010 before surgery is performed on the object, a non-real time diagnostic image, a real time diagnostic image, a surgical scene using the fourth imaging apparatus 14, etc. may be represented with a coordinate system of the fourth imaging apparatus 14 or a coordinate system of the position measuring apparatus 1410 (see FIG. 14).

Referring back to FIG. 6, the image overlaying unit 240 may detect a third pose relationship between the imaging apparatus 10 and the marker 60 by combining a pose relationship between the position measuring apparatus 1410 (see FIG. 14) and the marker 60 with a pose relationship between the position measuring apparatus 1410 (see FIG. 14) and the fourth imaging apparatus 14) (especially, a lens included in the fourth imaging apparatus 14).

The image overlaying unit 240 overlays the third real-time image with the corrected image by using the third pose relationship to obtain a combined image. The combined image may be a 3D medical image of an organ and a surrounding thereof. For example, the combined image is an image in which an image of a tissue outside an organ and a surrounding thereof included in the third real-time image captured by the fourth imaging apparatus 14 and an image of a tissue inside and outside an organ and a surrounding thereof included in the first non real-time image captured by the first imaging apparatus 11 are simultaneously shown in a 3D manner. The combined image may be an augmented image.

For example, the combined image of the image overlaying unit 240 may be generated such that positions of an organ shown in an endoscopic image and in a non-endoscopic image are the same. The endoscopic image is a 3D image of an organ and a surrounding around the organ. However, it is difficult to know information about a type and a position of a tissue inside and outside the organ from the endoscopic image.

In general, the non-endoscopic image may be a set of images obtained by photographing a section of the organ. However, the non-endoscopic image such as an ultrasonic image, a CT image, or an MR image includes observed information about the organ and about a type and position of the tissue inside and outside the organ and the surrounding around the organ. Accordingly, the non-endoscopic image includes information about not only a tissue outside an organ but also a type and position of a tissue inside the organ. Accordingly, when the endoscopic image and the non-endoscopic image are combined with each other, since information about a tissue inside and outside the organ and the surrounding around the organ may be accurately detected and is provided to the user, the user may perform surgery more precisely.

The non-endoscopic image such as an ultrasonic image, a CT image, or an MR image may be a 2D image according to a type of the imaging apparatus 10 that captures the non-endoscopic image, or a 3D image. If the non-endoscopic image is a plurality of 2D non-endoscopic images, the image generating unit 210 may generate the 2D non-endoscopic images as 3D non-endoscopic images by using any of well-known methods such as volume rendering, and the image overlaying unit 240 may use the 3D non-endoscopic images during overlaying.

Figure 7:
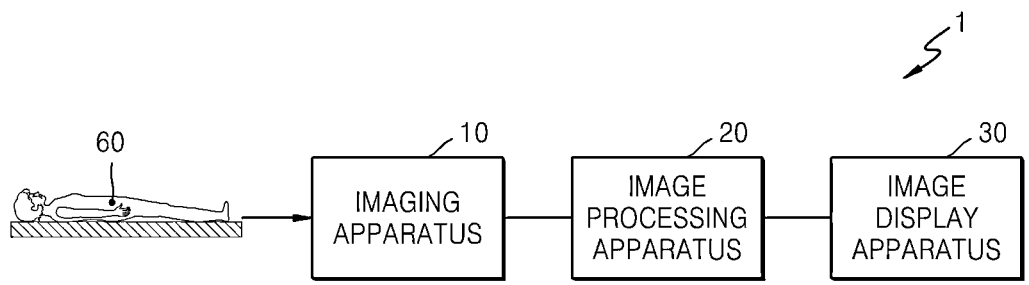
FIG. 7 is a view illustrating the system according to another embodiment of the present disclosure.

FIG. 7 is a view illustrating the system 1 according to another embodiment of the present disclosure. The system 1 includes the imaging apparatus 10, the image processing apparatus 20, and an image display apparatus 30.

As shown, the system 1 of FIG. 7 illustrates only elements related to the present embodiment. However, it would be understood by one of ordinary skill in the art that the system 1 may further include general-purpose elements other than the elements illustrated in FIG. 8.

Also, the system 1 of FIG. 7 is an example of the image processing apparatus 20 of FIGS. 1 and 6. Accordingly, description made with reference to FIGS. 1 and 6 is applicable to the system 1 of FIG. 7, and thus a repeated description will not be given.

The image display apparatus 30 displays images generated by the image processing apparatus 20. For example, the image display apparatus 30 includes output devices such as a display panel, an LCD screen, and a monitor provided on the system 1.

Figure 8:
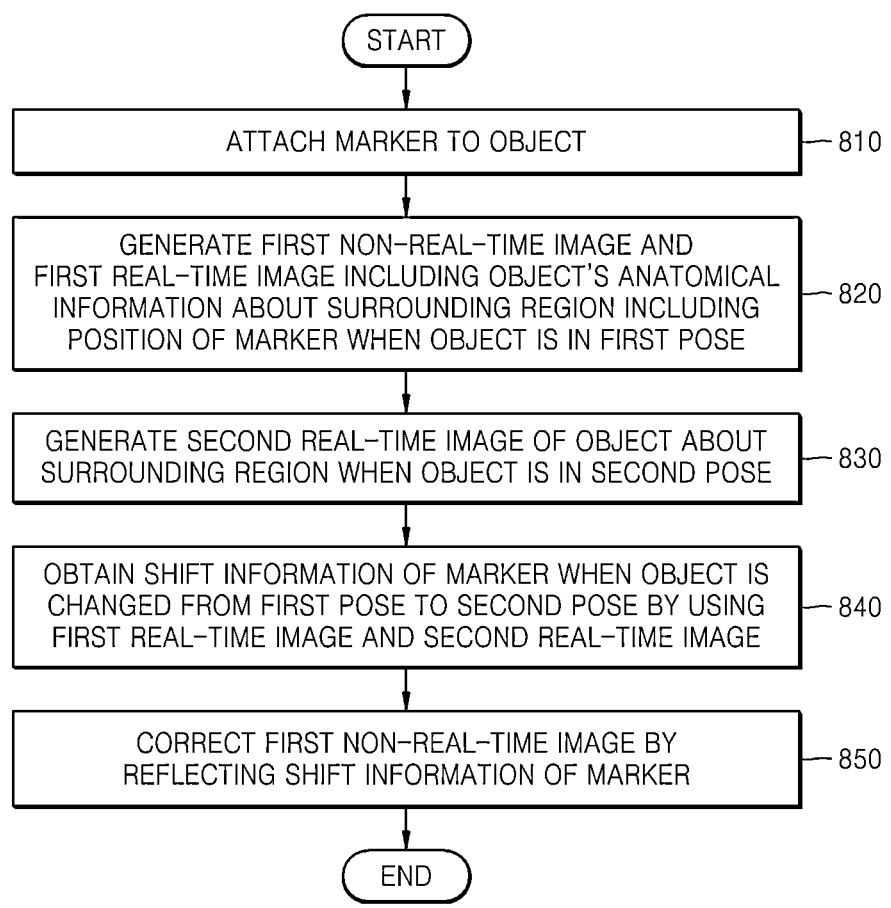
FIG. 8 is a flowchart illustrating a method of correcting an image which is performed by an image processing apparatus, according to an embodiment of the present disclosure.

FIG. 8 is a flowchart illustrating a method of correcting an image which is performed by the image processing apparatus 20, according to an embodiment of the present disclosure.

Referring to FIG. 8, the method includes operations sequentially performed by the image processing apparatus 20 or the system 1 of FIG. 1 of 7. Accordingly, although not described, description made for the image processing apparatus 20 or the system 1 of FIG. 1 or 7 may apply to the method of FIG. 8.

In operation 810, a user attaches a marker on an object. The marker may be attached to the object's skin which is adjacent to an organ inside the object's body to be treated.

In operation 820, the image generating unit 210 generates a first non-real-time image and a first real-time image including the object's anatomical information about a surrounding region including a position of the marker when the object is in a first pose.

In operation 830, the image generating unit 210 generates a second real-time image of the object about the surrounding region when the object is in a second pose.

In operation 840, the shift information obtaining unit 220 obtains shift information of the marker when the object is changed from the first pose to the second pose by using the first real-time image and the second real-time image.

In operation 850, the image correcting unit 230 corrects the first non-real-time image by reflecting the shift information of the marker to obtain a corrected image.

FIG. 9 is a flowchart illustrating a method of correcting an image which is performed by the image processing apparatus 20, according to another embodiment of the present disclosure.

Referring to FIG. 9, the method includes operations sequentially performed by the image processing apparatus 20 or the system 1 of FIG. 6 or 7. Accordingly, although not described, description made for the image processing apparatus 20 or the system 1 of FIG. 6 or 7 may apply to the method of FIG. 9.

Operations 910 through 950 respectively correspond to operations 810 through 850 of FIG. 8, and thus an explanation thereof will not be given.

In operation 960, the image generating unit 210 generates a third real-time image including the object's anatomical information about the surrounding region by using an imaging apparatus inserted into the object's body when the object is in the second pose.

In operation 970, the image overlaying unit 240 detects a third pose relationship between the imaging apparatus and the marker, and overlays the corrected image obtained by the image correcting unit 230 with the third real-time image by using the third pose relationship.

As described above, the image processing apparatus 20 may provide an accurate image by compensating for a shift of a skin due to a patient's pose variation when a diagnostic image is overlaid with a surgical image by using a marker. Also, when a simple surgical operation is performed by using a robot, the image processing apparatus 20 may provide image information that may control the robot.

The methods according to the above-described embodiments of the present disclosure may be embodied in a general-purpose digital computer by running program instructions recorded in a non-transitory computer-readable recording medium. Also, a structure of data used in the method may be recorded by using various units on a computer-readable recording medium. Examples of the computer-readable recording medium include storage media such as magnetic storage media (e.g., read only memories (ROMs), floppy discs, or hard discs), optically readable media (e.g., compact disk-read only memories (CD-ROMs), storage media (e.g., PC interface (PCI), PCI-express, or Wifi), etc.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image correcting apparatus described herein.

While the present disclosure has been particularly shown and described with reference to exemplary embodiments thereof by using specific terms, the embodiments and terms have merely been used to explain the present disclosure and should not be construed as limiting the scope of the present disclosure as defined by the claims. The exemplary embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. An image correcting method, comprising:
attaching a marker to an object, and generating a first non-real-time image, of a first image type, and a first real-time image, of a second image type, including the object's anatomical information about a surrounding region including a position of the marker when the object is in a first pose;
generating a second real-time image, of the second image type, of the object about the surrounding region when the object is in a second pose;
obtaining shift information of the marker based on the first real-time image and the second real-time image when the object is changed from the first pose to the second pose;
correcting, in a processor, the first non-real-time image based on the shift information of the marker; and
displaying the corrected first non-real-time image on a monitor;
wherein the obtaining of the shift information of the marker comprises:
determining a point at which a value measured in data included in the first real-time image exceeds a threshold value, and specifying a first pose relationship between the point and the marker;
selecting a point, corresponding to the point determined in the first real-time image, on the second real-time image, and specifying a second pose relationship between the point selected on the second real-time image and the marker; and
calculating a shift direction and a shift amount of the marker when the object is changed from the first pose to the second pose using the first pose relationship and the second pose relationship.

2. The method of claim 1, wherein the point at which the value exceeds the threshold value is a point selected in a tissue having a fixed position irrespective of the object's pose variation from among tissue in the object's body included in the first or second real-time image, and
wherein the first pose relationship or the second pose relationship is specified by representing positions of the point and a position of the marker on the first or second real-time image with coordinates.

3. The method of claim 2, wherein the point is a point obtained by segmenting a surface of the tissue having the fixed position in the first or second real-time image into a plurality of pieces and selecting a piece from among the plurality of pieces.

4. The method of claim 1, further comprising:
generating a third real-time image including the object's anatomical information about the surrounding region by using an imaging apparatus inserted into the object's body when the object is in the second pose;
wherein the first non-real-time image, the first real-time image, and the second real-time image are generated by using an imaging apparatus disposed outside the object's body.

5. The method of claim 3, further comprising:
detecting a third pose relationship between the imaging apparatus and the marker and overlaying the third real-time image with the corrected first non-real-time image by using the third pose relationship.

6. The method of claim 1, wherein the marker comprises a portion that is discernible in the first non-real-time image and the first and second real-time images, and is also discernible outside the object.

7. The method of claim 1, further comprising:
setting a plurality of points in the corrected first non-real-time image and the first non-real-time image;
measuring a distance between corresponding points of the corrected first non-real-time image and the first non-real-time image; and
determining whether the distance is equal to or less than a predetermined error value.

8. A non-transitory computer-readable recording medium having embodied thereon a program for executing the method of claim 1.

9. An image correcting apparatus, comprising:
a first image generating unit configured to generate a first non-real-time image, of a first image type, including an object's anatomical information about a surrounding region including a position of a marker attached to the object when the object is in a first pose;
a second image generating unit configured to generate a first real-time image, of a second image type, including the object's anatomical information about the surrounding region when the object is in the first pose;
a third image generating unit configured to generate a second real-time image, of the second image type, of the object about the surrounding region when the object is in a second pose;

a shift information obtaining unit configured to obtain shift information of the marker based on the first real-time image and the second real-time image when the object is changed from the first pose to the second pose; and an image correcting unit configured to correct the first non-real-time image based on the shift information of the marker;

wherein the shift information obtaining unit comprises:
- a first pose relationship specifying unit configured to determine a point at which a value measured in data included in the first real-time image exceeds a threshold value, and configured to specify a first pose relationship between the point and the marker;
- a second pose relationship specifying unit configured to determine a point, corresponding to the point determined by the first real-time image, on the second real-time image, and configured to specify a second pose relationship between the point determined by the second pose relationship specifying unit and the marker; and
- a shift amount and shift direction calculating unit configured to calculate a shift direction and a shift amount of the marker when the object is changed from the first pose to the second pose using the first pose relationship and the second pose relationship.

10. The apparatus of claim 9, wherein the point at which the value exceeds the threshold value is a point that is selected in a tissue having a fixed position irrespective of the object's pose variation from among tissue in the object's body included in the first or second real-time image, and wherein the first pose relationship or the second pose relationship is a relationship specified by representing positions of the point and the marker on the first or second real-time image with coordinates.

11. The apparatus of claim 10, wherein the point is a point obtained by segmenting a surface of the tissue having the fixed position on the first or second real-time image into a plurality of pieces and selecting a piece from among the plurality of pieces.

12. The apparatus of claim 9, further comprising:
a fourth image generating unit configured to generate a third real-time image including the object's anatomical information about the surrounding region by using an imaging apparatus inserted into the object's body when the object is in the second pose;

wherein the first non-real-time image, the first real-time image, and the second real-time image are images generated by using an imaging apparatus disposed outside the object's body.

13. The apparatus of claim 12, further comprising:
an image overlaying unit configured to specify a third pose relationship between the imaging apparatus and the marker, and configured to overlay the third real-time image with the corrected first non-real-time image by using the third pose relationship.

14. The apparatus of claim 9, wherein the marker comprises a portion that is discernible in the first non-real-time image and the first and second real-time images, and also is discernible outside the object.

15. The apparatus of claim 9, wherein the image correcting unit further comprises an evaluation unit configured to set a plurality of points in the corrected first non-real-time image and the first non-real-time image, configured to measure a distance between corresponding points of the corrected first non-real-time image and the first non-real-time image, and configured to determine whether the distance is equal to or less than a predetermined error value.

16. An image correcting system, comprising:
at least one imaging apparatus configured to generate a first non-real-time image, of a first image type, and first through third real-time images including anatomical information of an object to which a marker has been attached; and an image processing apparatus configured to obtain shift information of the marker using the first real-time image, of a second image type, and the second real-time image, of the second image type, of the object generated by the imaging apparatus, and configured to correct the first non-real-time image based on the shift information of the marker;

wherein the image processing apparatus comprises:
- a first pose relationship specifying unit configured to determine a point at which a value measured in data included in the first real-time image exceeds a threshold value, and configured to specify a first pose relationship between the point and the marker;
- a second pose relationship specifying unit configured to determine a point, corresponding to the point determined by the first real-time image, on the second real-time image, and configured to specify a second pose relationship between the point determined by the second pose relationship specifying unit and the marker; and
- a shift amount and shift direction calculating unit configured to calculate a shift direction and a shift amount of the marker when the object is changed from the first pose to the second pose using the first pose relationship and the second pose relationship.

* * * * *